R. RÜDENBERG & F. KOEHLER.
VALVE GEAR OF APPARATUS FOR CONVEYING LIQUIDS OR GASES.
APPLICATION FILED JUNE 22, 1911.
1,047,708.
Patented Dec. 17, 1912.
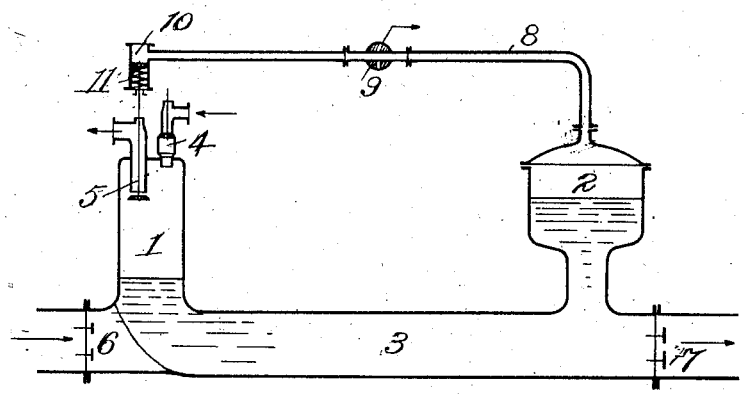
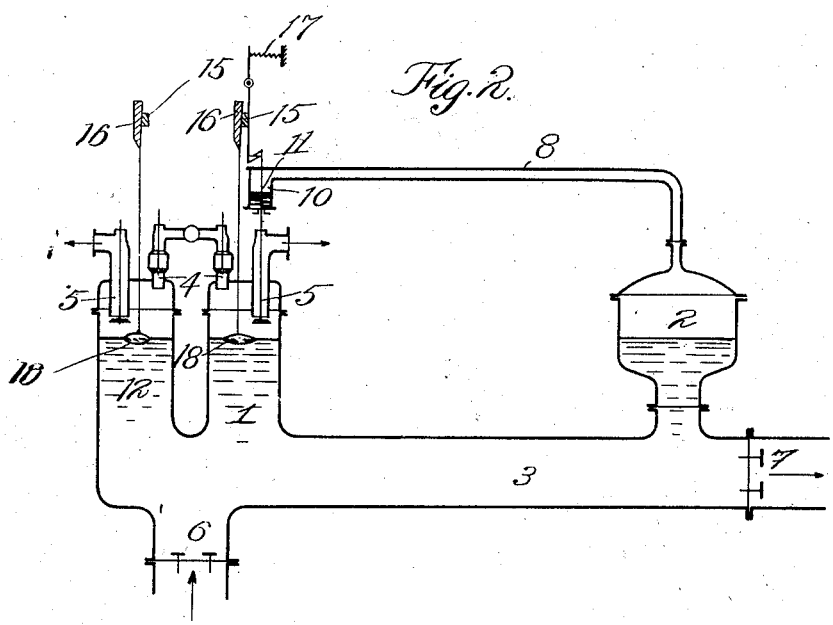

UNITED STATES PATENT OFFICE.

REINHOLD RÜDENBERG AND FERDINAND KOEHLER, OF CHARLOTTENBURG, GERMANY, ASSIGNORS TO SIEMENS SCHUCKERTWERKE G. M. B. H., OF BERLIN, GERMANY, A CORPORATION OF GERMANY.

VALVE-GEAR OF APPARATUS FOR CONVEYING LIQUIDS OR GASES.

1,047,708.

Specification of Letters Patent.

Patented Dec. 17, 1912.

Application filed June 22, 1911. Serial No. 634,832.

*To all whom it may concern:*

Be it known that we, REINHOLD RÜDENBERG and FERDINAND KOEHLER, subjects of the German Emperor, and residing at Charlottenburg, near Berlin, Germany, have invented certain new and useful Improvements in Valve-Gear of Apparatus for Conveying Liquids or Gases, of which the following is a specification.

This invention relates to the valve gear of those apparatuses for conveying liquids or gases, in which a column of liquid is set in motion by the pressure of a gas.

The invention consists in making the valve gear dependent on the pressures of an air vessel which are proportional to the height of the column of liquid for the time being.

One illustrative embodiment of the invention and a modification thereof are represented by way of example in the accompanying drawing, wherein:—

Figure 1 is a vertical sectional elevation showing one form of the improved gear, and Fig. 2 is a like view of a modified form.

Referring firstly to Fig. 1, the pump here shown comprises a combustion chamber 1 which, with the exception of a small part containing a compressed combustible gaseous mixture, is filled with liquid at the beginning of the cycle of operations. When ignition takes place the liquid is forced out of the combustion chamber into the pipe 3 connected therewith, and part of it passes through check valves 7 into the delivery pipe and part into an air vessel 2. In consequence of the kinetic energy of the column of liquid the latter oscillates in the pipe 3, and continues to do so when the pressure of the gases has fallen in the combustion chamber and thereby produces a pressure below atmospheric therein, and consequently fresh liquid is sucked in through the suction valves 6.

The column of liquid gradually comes to rest owing to its filling the free chamber of the air vessel and correspondingly increasing the pressure of the latter. The energy stored in the air contained in the air vessel now forces the column of liquid back again so that it swings back out of the pipe 3 into the combustion chamber and commences to rise in the latter. At about the lowest level of the liquid in the combustion chamber the exhaust valve 5 opens, so that when the chamber is being refilled the burnt gases are driven out. The rising level of the liquid presses the exhaust valve against its seat and closes it. As the liquid rises further it compresses the residue of gas or scavenging air still at the top of the combustion chamber above the exhaust valve until it becomes stationary again, whereupon it is driven away from the combustion chamber again owing to the expansion of this air cushion and consequently makes its third stroke. During this movement the inlet valve 4 opens, new gas is sucked in until the kinetic energy of the column of liquid is again used up by compressing air in the air vessel. The fourth stroke of the liquid piston now begins, this being again directed toward the combustion chamber, and compresses the previously sucked in gaseous mixture which operation takes place, of course, when the gas inlet valve is closed. Ignition subsequently takes place and the cycle of operations is repeated.

In this pump it is difficult always to operate the valves at the correct moment. The height of the liquid piston is solely decisive as to the moment when the valves must be operated, e. g., as to when the exhaust valve must be opened; in contradistinction to the position of a metal piston, however, this position cannot be directly indicated outside at all or only imperfectly by a mechanical member, by which the valve gear could be controlled.

Now according to this invention the pressure of the air in the air vessel 2 is used for actuating the valve gear. In this case, this vessel is also the air vessel which simultaneously supplies the energy for the return oscillation of the column of liquid, which arrangement is specially simple but, it is, of course, to be understood that this is not absolutely necessary, and the vessel may be any desired air vessel whose pressure corresponds to the momentary position of the liquid piston.

When the pressure in the air vessel 2 is greatest the level of the liquid in the combustion chamber has reached its lowest position. If the air vessel 2 is connected by a pipe 8 with an air cylinder 10, whose piston 11 indirectly or directly opens the exhaust valve 5, the piston 11 must be of such a size that it opens the exhaust valve precisely when the pressure in the air vessel is a maximum.

It is to be understood that any desired closing or regulating members 9 may be provided in the pipe 8.

The described gear cannot be employed without modification in pumps according to Fig. 2. This pump operates as follows:— While the condition after the fourth stroke exists in the chamber 1 and the chamber is consequently filled with liquid and compressed fresh gaseous mixture, there exists in chamber 12 the condition after the second stroke, i. e., the liquid flowing back into the chamber has expelled the products of combustion and filled the chamber. When ignition now takes place in chamber 1, the column of liquid is driven out of this chamber and carries along with it that out of chamber 12. A portion of the liquid thrown forward enters into the air vessel 2, while the remainder is conveyed outward through the check valves 7.

Owing to the pressure below atmospheric produced near the chambers 1 and 12 new liquid is sucked in through the suction valves 6 and fresh gaseous mixture through the inlet valve 4 in chamber 12. When the level of the liquid in the combustion chambers is lowest the exhaust valve 5 of the chamber 1 opens, while the inlet valve of chamber 12 closes and the exhaust valve 5 of this chamber continues to remain closed. When the column of liquid returns from the air vessel the residues of gases in chamber 1 are expelled, while the new mixture is compressed in chamber 12. Ignition then occurs in chamber 12 and the cycle of operation is repeated, the parts played in the chambers being exchanged.

Each time the air pressure in the air vessel attains a maximum, i. e., when the level of liquid in one of the chambers has sunk to its lowest point, the exhaust valve of the one chamber must be opened and the other must remain closed alternately. According to the invention and as illustrated in Fig. 2 this changing control can also be brought about by the pressure of the same air vessel which is, of course, not influenced by the exchange of the functions of the parts in the chambers, when supplementary governing means are provided which take into account this change. Such supplementary governing can be brought about, for example, by using the height for the time being of the level of liquid in the combustion chamber for actuating a governing member, as will be understood from the following.

Fig. 2 represents, by way of example, the gear of the exhaust valve 5 of chamber 1. Here again the pressure of the air vessel acts on a piston 11 and by forcing the same downward tends to open the exhaust valve 5. A catch 15, however, holds the valve closed. Only when the level of liquid in chamber 1 and with it a float 18 has quite descended does a stop 16 drawn down by the float release the catch which is then withdrawn by a spring 17, whereupon the air pressure on the piston 11 can become operative and open the exhaust valve 5. At the same time the level of liquid in the adjacent chamber 12 has not fallen so low as in chamber 1 because as much liquid has not been ejected from chamber 12 by the suction stroke as from chamber 1 by the explosion stroke. Consequently, when a similar float is arranged in like manner in chamber 12 the exhaust valve of the latter will not yet be released so that the same remains closed for the return stroke.

We claim:—

1. In apparatus of the character described, for conveying liquids or gases, the combination with an ignition chamber having a gas inlet and an exhaust valve, a pipe connected to the ignition chamber and containing a column of water able to oscillate freely therein, and an air vessel connected to the pipe, the pressure in the air vessel being proportional to the height of the column of liquid, of means controlled through the medium of the pressure in the air vessel for actuating one of the said valves.

2. In apparatus of the character described for conveying liquids or gases, the combination with an ignition chamber having a gas inlet and an exhaust valve, a pipe connected to the ignition chamber and containing a column of water able to oscillate freely therein, and an air vessel connected to the pipe, the pressure in the air vessel being proportional to the height of the column of liquid, of means controlled through the medium of the pressure in the air vessel for actuating the said exhaust valve.

3. In apparatus of the character described for conveying liquids or gases, the combination with an ignition chamber having a gas inlet and an exhaust valve, a pipe connected to the ignition chamber and containing a column of water able to oscillate freely therein, and an air vessel connected to the pipe, the pressure in the air vessel being proportional to the height of the column of liquid, of means controlled in direct dependence on the pressure in the air vessel for actuating the said exhaust valve.

4. In apparatus of the character described for conveying liquids or gases, the combination with an ignition chamber having a gas inlet and an exhaust valve, a pipe connected to the ignition chamber and containing a column of water able to oscillate freely therein, and an air vessel connected to the pipe, the pressure in the air vessel being proportional to the height of the column of liquid, of locking means for holding the exhaust valve in its closed position, means actuated in dependence on the pressure of the column of liquid for controlling the locking means, and means controlled by the pressure in the air vessel for actuating the said exhaust valve when the same is unlocked by the said locking means.

5. In apparatus of the character described for conveying liquids or gases, the combination with an ignition chamber having a gas inlet and an exhaust valve, a pipe connected to the ignition chamber and containing a column of water able to oscillate freely therein; and an air vessel connected to the pipe, the pressure in the air vessel being proportional to the height of the column of liquid, of locking means comprising a float floating on the column of liquid for locking the exhaust valve in dependence on the height of the column of liquid, and means controlled in dependence on the pressure in the air vessel for actuating the exhaust valve when the same is unlocked by the said locking means.

In testimony whereof we have signed our names to this specification in the presence of two witnesses.

REINHOLD RÜDENBERG.
FERDINAND KOEHLER.

Witnesses:
WOLDEMAR HAUPT,
HENRY HASPER.